(12) United States Patent
Behnia et al.

(10) Patent No.: US 9,152,413 B2
(45) Date of Patent: Oct. 6, 2015

(54) BI-DIRECTIONAL COMMUNICATION BETWEEN CHANGE MANAGEMENT TOOL AND IMPLEMENTATION TOOLS

(71) Applicant: BMC Software, Inc., Houston, TX (US)

(72) Inventors: Kia Behnia, Burlingame, CA (US); Douglas Mueller, Palo Alto, CA (US)

(73) Assignee: BMC SOFTWARE, INC., Houston, TX (US)

( * ) Notice: Subject to any disclaimer, the term of this patent is extended or adjusted under 35 U.S.C. 154(b) by 0 days.

(21) Appl. No.: 14/535,030

(22) Filed: Nov. 6, 2014

(65) Prior Publication Data

US 2015/0067643 A1    Mar. 5, 2015

Related U.S. Application Data

(63) Continuation of application No. 11/741,709, filed on Apr. 27, 2007, now Pat. No. 8,887,133.

(60) Provisional application No. 60/745,872, filed on Apr. 28, 2006.

(51) Int. Cl.
*G06F 9/44* (2006.01)

(52) U.S. Cl.
CPC ..... *G06F 8/71* (2013.01); *G06F 8/70* (2013.01)

(58) Field of Classification Search
CPC ........................................................ G06F 8/70
USPC ........................................................ 717/120
See application file for complete search history.

(56) References Cited

U.S. PATENT DOCUMENTS

| 6,996,601 | B1 * | 2/2006 | Smith .......................... 709/203 |
| 7,051,092 | B2 | 5/2006 | Lenz et al. |
| 7,254,831 | B2 | 8/2007 | Saunders et al. |
| 7,337,124 | B2 * | 2/2008 | Corral .......................... 705/7.17 |
| 7,484,212 | B2 * | 1/2009 | Hellerstein et al. ........... 718/100 |
| 7,735,086 | B2 * | 6/2010 | Hellerstein et al. ........... 718/105 |
| 8,887,133 | B2 | 11/2014 | Behnia et al. |
| 2005/0022156 | A1 * | 1/2005 | Schwan et al. ................ 717/102 |

OTHER PUBLICATIONS

Jonathan Sillito et al., "Managing Software Change Tasks: An Exploratory Study", 2005, IEEE, pp. 23-32.*

(Continued)

*Primary Examiner* — Wei Zhen
*Assistant Examiner* — Lanny Ung
(74) *Attorney, Agent, or Firm* — Brake Hughes Bellermann LLP

(57) ABSTRACT

Task implementation tools are registered to interface with a change management tool. The change management tool configures a plurality of tasks to implement a change to an information technology infrastructure's configuration, and sends a plurality of task instructions to the plurality of task implementation tools for performing the plurality of tasks. Each task instruction is directed to a targeted task implementation tool for performing a particular task and includes task-related information for the targeted implementation tool to perform the particular task. Registering the plurality of task implementation tools to interface with the change management tool includes registering each the plurality of task implementation tools to accept the task instruction for the particular task directed to it from the change management tool, to know what to do with the task instruction and to know how to respond to the task instruction.

20 Claims, 8 Drawing Sheets

(56) References Cited

OTHER PUBLICATIONS

Non-Final Office Action received for U.S. Appl. No. 11/741,709, mailed on Nov. 26, 2010, 20 pages.
Response to Non-Final Office Action for U.S. Appl. No. 11/741,709, filed Feb. 28, 2011, 18 pages.
Final Office Action received for U.S. Appl. No. 11/741,709, mailed on Apr. 15, 2011, 23 pages.
Response to Final Office Action for U.S. Appl. No. 11/741,709, filed Jun. 30, 2011, 11 pages.
Advisory Action received for U.S. Appl. No. 11/741,709, mailed on Aug. 4, 2011, 3 pages.
Non-Final Office Action received for U.S. Appl. No. 11/741,709, mailed on May 8, 2013, 23 pages.
Response to Non-Final Office Action for U.S. Appl. No. 11/741,709, filed Aug. 8, 2011, 13 pages.
Final Office Action received for U.S. Appl. No. 11/741,709, mailed on Oct. 9, 2013, 32 pages.
Response to Final Office Action for U.S. Appl. No. 11/741,709, filed Jan. 16, 2014, 11 pages.
Non-Final Office Action received for U.S. Appl. No. 11/741,709, mailed on Feb. 26, 2014, 16 pages.
Response to Non-Final Office Action for U.S. Appl. No. 11/741,709, filed May 23, 2014, 14 pages.
Notice of Allowance received for U.S. Appl. No. 11/741,709, mailed on Jul. 10, 2014, 8 pages.

\* cited by examiner

BI-DIRECTIONAL COMMUNICATION BETWEEN CHANGE MANAGEMENT TOOL AND IMPLEMENTATION TOOLS

CROSS-REFERENCE TO RELATED APPLICATIONS

This application is a continuation of U.S. patent application Ser. No. 11/741,709, which was filed on Apr. 27, 2007 as a non-provisional of U.S. Provisional Application Ser. No. 60/745,872, filed on Apr. 28, 2006, both of which applications are incorporated by reference herein in their entireties.

FIELD OF THE DISCLOSURE

The subject matter of the present disclosure relates to bi-directional communication between a change management tool and implementation tools in an Information Technology Infrastructure.

BACKGROUND OF THE DISCLOSURE

Today many organizations implement solutions to manage the process of requesting, planning, and implementing changes to their Information Technology ("IT") infrastructure. Sometimes, multiple, related changes must be made to software and/or hardware components of the infrastructure. Such changes can also be referred to as "releases." Traditionally, organizations use multiple tools to implement such changes and/or issue new releases in a piece-wise fashion where each tool is used to implement its part independently. One problem with this piece-wise approach is that often the operations to institute the multiple changes across the existing infrastructure involve dependent and related changes that need to be planned, approved, and implemented in a coordinated way. Complicating the implementation of such changes are the compliance concerns over verification of the changes across multiple toolsets.

In one prior art approach, organizations use a tool to handle the request for a change, plan the change using the tool, and then individually assign the tasks associated with the change/release to a group of individuals that actually perform, or implement, the desired changes. As one example, the tool may be the Remedy Change Management 7.0 by BMC Software, Inc. After performing the change/release, these individuals would manually update the status of the change (e.g., via a configuration management tool) in a piece wise fashion to indicate that the change was implemented. If needed for compliance purposes, one or more individuals could then manually verify the changes. While this approach may provide some control during the planning of a change, it provides no assistance for automating changes or for verifying that approved changes were made.

FIG. 1 shows a tool 100 according to the prior art for implementing changes in an IT infrastructure. The tool 100 is generally manual and operates in a piece-wise fashion as discussed earlier. For example, the tool 100 receives a change request 102 that can involve software distribution, software patch management, hardware parameter adjustments, adding a new user, or other type of change to the hardware and software components of the IT infrastructure. Using the tool 100, administrators can review the change request 102, approve the request, and plan its implementation. Once ready to implement, a number of implementation actions 110/115 are sent to various implementation tools 160/165 in the IT infrastructure. Typically, one change request 102 can generate numerous individual implementation actions 110/115 for numerous implementation tools 160/165. Each implementation tool 160/165 then performs the requested action 162 and registers a response 164 either manually or automatically.

In this prior art approach, each implementation tool 160/165 performs its implementation action 110/115 without any knowledge of why the action is performed. Thus, each implementation tool 160/165 has no knowledge of any other tool being used or what its actual role is in solving the original change request 102. In addition, the implementation tools 160/165 may have their own login or access criteria, thereby hindering any automation of the change process in the infrastructure.

In another prior art approach, overall process management is abandoned in favor of using multiple, distinct tools. One problem with this approach is that one change is often related to, or has dependencies upon, other changes. Managing the change process with a single tool can only take into account those changes under control of that tool. For example, imagine the case where a complex application (e.g., a customer billing system) needs to be updated—a process that will require changes to a number of different application and database components. Even if the application and database updates where closely coordinated and automated, there is no guarantee that they would not conflict with a change being administered elsewhere in the system at the same time (e.g., to a networking device).

The subject matter of the present disclosure is directed to overcoming, or at least reducing the effects of, one or more of the problems set forth above.

SUMMARY OF THE DISCLOSURE

Systems and methods for conducting bi-directional communication between a change management tool and implementation tools in an IT infrastructure are disclosed. The change management tool is used to configure tasks to implement a change to the configuration of an IT infrastructure using implementation tools deployed on the infrastructure. In configuring the change, the change management tool assigns tag information to the change. To facilitate bi-directional communication and tracking, the tag information preferably includes a first identifier (e.g., a Change ID) associated with the requested change and includes second identifiers (e.g., Task IDs) associated with each of the tasks configured to implement the change.

Once the tasks are configured, the change management tool manually or automatically sends task instructions to the implementation tools to perform the tasks. The task instructions include the identifiers and other task-related information to implement the task. After implementing or failing to implement its task, the implementation tools send responses to the change management tool, which receives implementation results in the responses. To facilitate the bi-directional communication and tracking, each response includes the identifiers along with the implementation result. Using the configuration based on the identifiers, the change management tool maps/associates each implementation result to the tasks and other requirements associated with the configuration change.

The mapped/associated results can then be made available for subsequent processing to meet various purposes. For example, the associated results can be available to a user or to another software application. In a basic form, the user can assess the status (e.g., success or failure) of the configuration change across the multiple tasks and implementation tools. In other more sophisticated forms, the user or the change management tool can test, interpret, check, etc. the results so that further decisions related to the change process can be made. In another form of subsequent processing, the change management tool can use the associated results to determining which subsequent task to perform in implementing the change. For example, if implementation of given task returns a specific result, conditions or qualifications configured in the change management tool may indicate that one subsequent task should follow rather than another in order to implement the change request. In yet another for of subsequent processing, the change management tool can use the associated results as inputs for subsequent tasks that are to be performed in implementing the change.

BRIEF DESCRIPTION OF THE DRAWINGS

FIGS. 5A-5D illustrate views of a task template form of the task management tool.

FIGS. 6A-6D illustrate views of a task group template form of the task management tool.

FIG. 8B illustrates a return code form for configuring return codes received from registered implementation tools.

FIG. 8C illustrates an integration form for configuring an interface between an implementation tool and the change management tool.

DETAILED DESCRIPTION

In accordance with the invention, bi-directional communication is provided between a change management tool and implementation tools. The data communicated from the change management tool (which may also be referred to as a release management tool) to an implementation tool may include, but is not limited to: a change/release identifier (associated with an approved change/release operation); a task identifier (associated with a task to implement part of the change/release); configuration information on where the change needs to be implemented (e.g., applications, systems, groups of systems, groups of applications, or devices); the criticality or priority of the change/release; and one or more methods to automatically invoke an implementation tool. Similarly, data communicated to the change management tool from an implementation tool may include, but is not limited to: one or more methods to automatically invoke the change management tool; a task identifier (associated with the task to implement a part of the change); a change/release identifier (associated with the approved change/release operation); configuration information on where the change needs to be implemented (e.g., applications, systems, groups of systems, groups of applications, or devices); task status; and additional details (e.g., implementation time, cost, etc.). Coordinating change/release and implementation operations using the disclosed bidirectional communication provides a great deal of automation with respect to scheduling, authorizing, implementing, and verifying proposed changes across the IT infrastructure.

Figure 1:
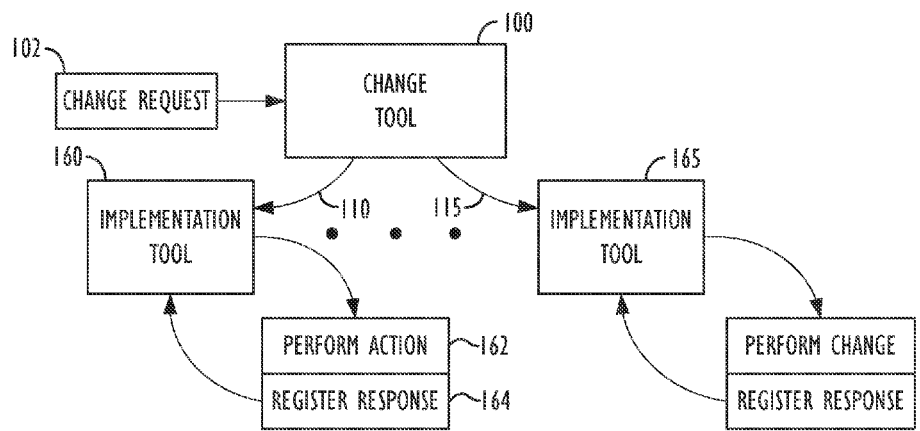
FIG. 1 illustrates a tool and associated components according to the prior art for implementing a change to an IT infrastructure.
Figure 2:
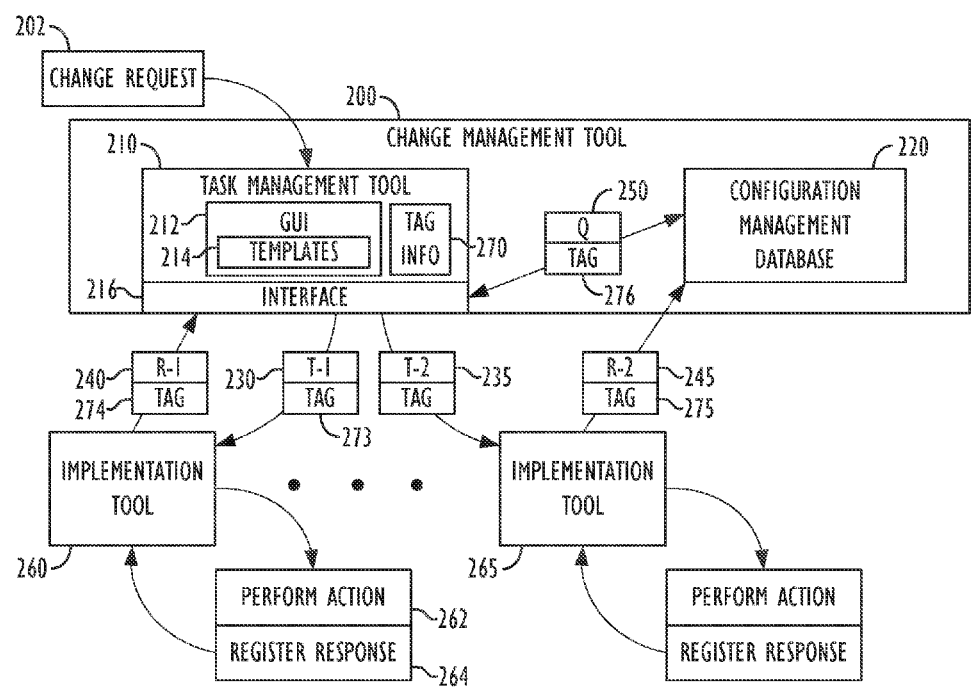
FIG. 2 illustrates one embodiment of a change management tool having a task management tool and associated components for implementing a configuration change to an IT infrastructure.

FIG. 2 shows a change management tool 200 according to one embodiment relative to a plurality of implementation tools 260/265. The implementation tools 260/265 are distributed across an IT infrastructure for implementing changes to various software components, hardware components, and other aspects of the infrastructure's configuration. Thus, in the context of the present disclosure, the implementation tools 260/265 may be software tools for performing actions (manually or automatically) to implement a change to the infrastructure's configuration. Some typical examples of the types of changes that may be made to the infrastructure's configuration include releases of software packages, deployment of software patches, management of software licenses, updating policies, and other changes/releases. Preferably, a consistent and controlled process is used to make such changes.

To achieve such consistency and control, the change management tool 200 provides a "closed loop" approach to implement configuration changes. In this closed loop, the change management tool 200 automatically transfers information between stages of operation to maintain the integrity of the configuration change. In addition, the change management tool 200 can track whether changes to the configuration are made successfully by verifying the implementation of software-related and other tasks required to make the change. Finally, verification of the tasks by the change management tool 200 also provides administrators with audit trails of the changes made to the configuration.

To help store the configuration of the infrastructure, the change management tool 200 includes a database 220. In one embodiment, the database 220 is a configuration management database ("CMDB") in accordance with the Information Technology Infrastructure Library ("ITIL") standard. Such a database 220 is well known in the art and generally stores configuration information related to rules, policies, and resources (software, hardware, etc.) of the IT infrastructure.

To help handle configuration changes, the change management tool 200 includes a task management tool 210. Although illustrated as part of the change management tool 200, the task management tool 210 may actually be a separate application capable of operating in conjunction with the change management tool 200. The task management tool 210 is used to manage the various tasks required to implement a requested change to the infrastructure's configuration.

Figure 3:
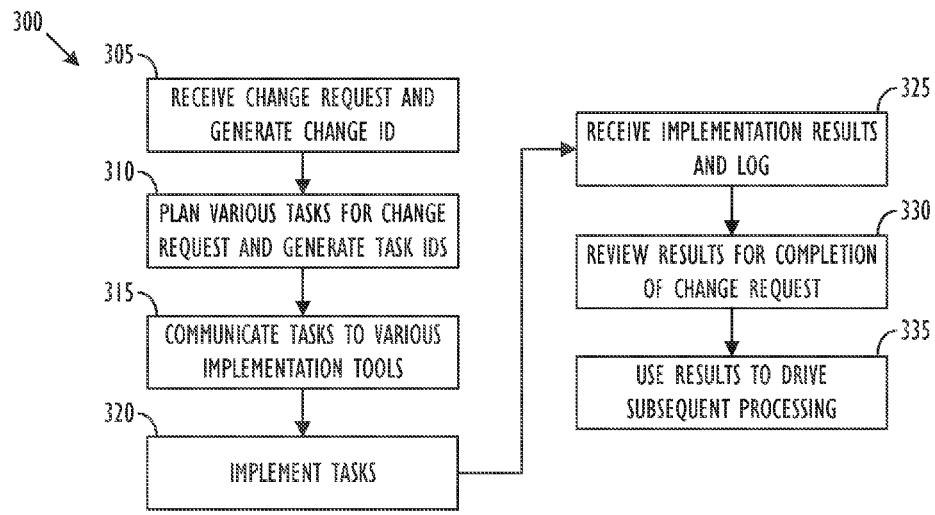
FIG. 3 illustrates a process of how the disclosed change management tool can be used to manage the configuration change to the IT infrastructure.

FIG. 3 shows a process 300 of using the change management tool 200 and task management tool 210 to manage a change to the infrastructure's configuration. During use, the change management tool 200 receives a change request 202 and generates a unique identifier for that request (e.g., a Change ID) (Block 305). One typical example of a change request 202 involves a request to release and install the latest version of a software application on systems of the infrastructure. In such an example, a user may submit a service request to install the latest version of the software application on one or more systems. More generally, the change request 202 can include, but may not be limited to, a request to distribute software, manage a software patch, adjust a hardware parameter, configure new user information, or perform some other type of change to the hardware or software configuration of the IT infrastructure.

In a subsequent stage, administrators use the task management tool 210 to configure and plan various tasks to implement the change request 202 and to generate tag information 270 for those various tasks (Block 310). The tag information 270, for example, includes the unique identifier for the change request 202 (e.g., Change ID) and includes unique identifiers for each of the configured tasks (e.g., Task IDs), among other information disclosed herein. The identifiers can generally be character strings of a global unique identifier (GUID). As will be discussed below, the tag information 270 is used in the bi-directional communication between the change management tool 200 and the implementation tools 260/265. To achieve the communication, the tag information 270 can comprise any suitable data structure, protocol, and standard known in the art for communicating information between software tools and hardware components of an IT infrastructure.

In general, the tasks can be policy-based, deployment-based, or verification-based. Policy-based tasks include tasks for deploying applications and data, deploying patches, harvesting licenses when maximum limits have been exceeded, and enforcing the removal of unauthorized applications. Deployment-based tasks include tasks for deploying software or data and executing one-time jobs, commands, and scripts. Verification-based tasks include tasks to verify compliance for policy-based tasks based on a target, package, or both. Each change request 202 can require multiple tasks of different types with each task being essential to the successful implementation of the change. In addition, the change request 202 may require various implementation tools 260/265 throughout the IT infrastructure to implement the multiple tasks. Moreover, the multiple tasks may need to be performed in a defined sequence or workflow.

To facilitate management of the tasks, the task management tool 210 has a graphical user interface (GUI) 212 having a plurality of task template forms 214 and other forms that allow users to configure the various tasks and input information consistently. The template forms 214 contain fields for the input and output of information and variables used during the change management process. Some of the template forms 214 may have a variable structure so that information can be exchanged automatically between the forms 214. In addition, the task template forms 214 can be grouped together and related by associations and workflows. To do this, the task management tool 210 allows users to collect together individual task template forms 214 as a group, define associations between task template forms 214 or groups of task template forms 214, define a workflow or sequencing scheme for implementing the various task templates forms 214 and groups, and define dependencies between the associated task template forms 214 and groups.

In the next stage, the task management tool 210 communicates task instructions 230/235 to targeted implementation tools 260/265 deployed across the infrastructure (Block 215). The task instructions 230/235 include task-related information for the targeted implementation tool 260/265 to perform the task. The task instructions 230/235 also include tag information 273 (e.g., Change ID, Task ID, etc.) for identification, tracking, auditing, and other purposes disclosed herein. This tag information 273 comes from the tag information 270 generated automatically and manually when the tasks are configured and planned. In generally, the tag information 273 for each task instruction 230/235 may or may not be the same depending on the particular tasks, designated implementation tools, and other factors.

The task management tool 210 sends out the various task instructions 230/235 using an interface 216 configured between the task management tool 210 and the implementation tools 260/265. This interface 216 can automatically launch and/or can be manually activated in some embodiments so that task instructions 230/235 can be implemented automatically or manually based on the IT infrastructure and various required tasks. When communicating the task instructions 230/235, the task management tool 210 can send different types of tasks (e.g., policy, deployment, and verification tasks) in a specified sequence according to a desired workflow (See e.g., FIG. 4).

Upon receiving the task instructions 230/235, the implementation tools 260/265 then perform the requested actions 262 of these tasks (Block 320). Because the implementation tools 260/265 are preconfigured for integration with the change management tool 200, the interface and communication of the task instructions 230/235 to the implementation tools 260/265 can be performed with seamless authentication. In this way, the implementation tool 260/265 can launch the requested actions 262 without requiring additional authentication or user intervention (such as entry of a user ID and password).

Each implementation tool 260 also registers a response 264 for the performed action 262. For example, the response 264 can indicate whether the action 230/235 has succeeded or failed or the response may be some variable or other parameter. Once the response 264 is registered, the implementation tools 260/265 send results 240/245 back to the change management tool 200, which logs the various results 240/245 (Block 325). The results 240/245 include details or results that may indicate whether implementation of the task has resulted in completion, error, failure, or other variable. For example, the results 240/245 can include a return code value or some other indication of whether implementation of the requested task was successful or not. Furthermore, the results 240/245 include tag information 274 (e.g., Change ID and Task ID) used for tracking, verification, and auditing. Because the identifiers are included in the results 240/245, the change management tool 200 is better able to match and track the implementation of the change request 202 and all of the various tasks and subtasks associated with it across the IT infrastructure. Based on the tagged results 240/245 it receives, the change management tool 200 can then verify the implementation of the change request 202 and perform other reporting functions.

To return results, each implementation tool 260/265 can automatically respond, or the change management tool 200 can query or "ping" the implementation tool 260/265 using tag information (e.g., Change and Task IDs) to get specific results or response codes. The implementation tool 260/265 can also deliver results to a third party application. After that, the change management tool 200 can query that application for the results using tag information for identification.

In returning results, for example, the implementation tool 260 can communicate its result 240 directly back to the task management tool 210 with information about the implementation identified by the associated tag information 274. This form of returning results may be suitable for web-based interactions between the task management tool 210 and the implementation tool 260 that may be a third party application and not already configured to communicate directly with the configuration management database 220.

Alternatively, the implementation tool 265 can communicate information in a result 245 directly to the configuration management database 220 or some other third party application. This form of returning results may be suited for automated implementation tools 265 configured to auto-launch and communicate directly with the configuration management database 220 using a required format, protocol, etc. Subsequent interactions 250 made at arbitrary or regular intervals between the task management tool 210 and the configuration management database 220 can be used to exchange implementation details and other information identified by the tag information 275 so that tasks and the change request 202 can be updated.

In a review stage, administrators use the change management tool 200 to review whether the change request 202 was indeed completed and can test, interpret, check, etc. the implementation results so that further decisions related to the change process can be made (Block 330). Because information regarding the task identifier, target, and packages has been automatically returned to the configuration management tool 200 in tag information 274, the tool 200 can automatically verify the status of the task whenever a result 240/245 is received. If the task is successful, the tool 200 can mark the task as closed. In the review stage, the administrators can also analyze key performance indicators (KPIs), how many incidents were eliminated by the change request 202, and the accuracy of the configuration management database 220.

In addition to making implementation results available for review and other like purposes, the change management tool 200 can use the returned implementation results to drive subsequent processing steps to implement the change (Block 335). Two forms of driving subsequent processing are discussed below. It will be appreciated that the change management tool 200 can use these and other forms of subsequent processing based on returned implementation results.

In one form of subsequent processing, the change management tool 200 can use the returned results to determine what subsequent tasks to perform in order to implement the change request 202. If, for example, implementation of given task returns a specific result, conditions or qualifications configured in the change management tool 200 may automatically indicate that a particular task (as opposed to some other task) should subsequently be performed to implement the change.

In another form of subsequent processing, the change management tool 200 can use the implemented result of a given task as input for a subsequent task to be performed in implementing the change. For example, a first task may require an implementation tool to look up information about a machine assigned to a particular user (e.g., obtain a network address from the configuration management database 220). Then, that information can be used in a subsequent task to install a given piece of software on the identified machine.

As discussed above, the tag information 270 in various forms (273, 274, 275, and 276) facilitates the bidirectional communication between the change management tool 200, task management tool 210, and the implementation tools 260. The tag information 270 may be multi-part and at least include unique identifiers, such as Change ID and Task ID. The tag information 270 may also include time stamps and information about target machines. In addition, the tag information 270 can identify an overall process, a subtask of that process, and a location in the configuration management database 220 so that the implementation tool 260/265 can provide data to the configuration management database 220 for the IT infrastructure.

Additionally, the tag information 270 can include information to eliminate the need for the change management tool 200 to mediate all activities of each implementation tool 260/265 to make changes. For example, the tag information 270 can include login and authentication information to allow the implementation tools 260/265 to execute the actions 262 of the task without the need for user intervention. Preferably, any such login and authentication information of this nature is encrypted so that the tag information 270 itself or any part of it may be encrypted using techniques known in the art. The tag information 270 can include access information so that the implementation tools 260/265 can access third party data to accomplish a task and can also include command line instructions or the like. In this way, the implementation tool 260/265 can access a database (e.g., configuration management database 220) to identify required data needed to accomplish some implementation task.

Figure 4:
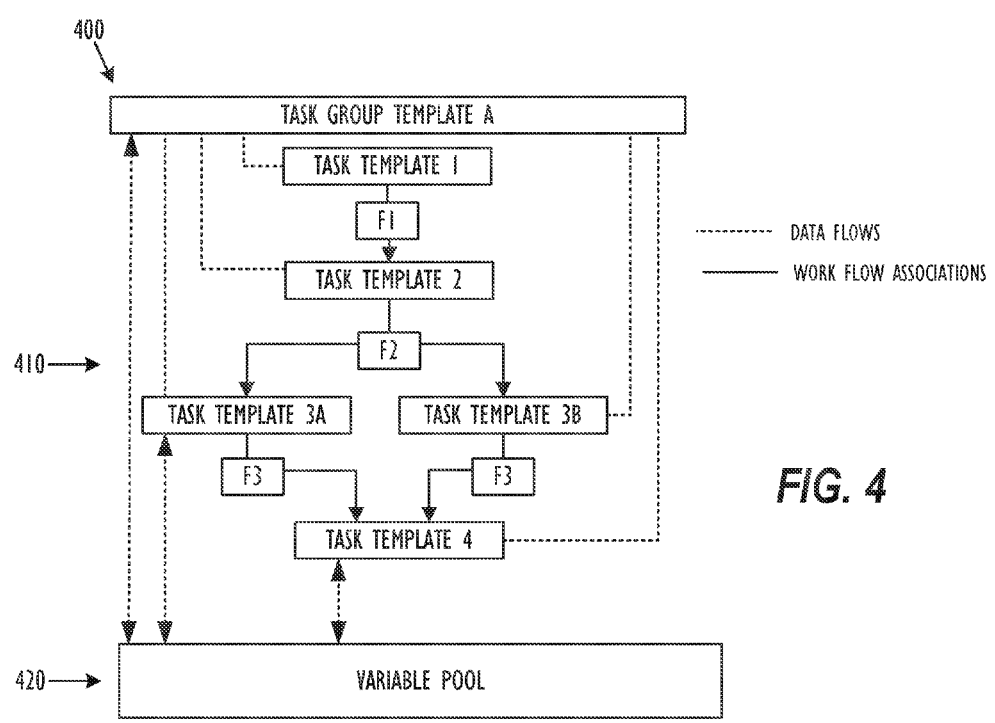
FIG. 4 illustrates an example of how task template forms can be grouped and arranged in a workflow using the task management tool.

As noted previously, a given change request 202 may involve a number of tasks. Therefore, the task implementation tool 210 allows administrators to group the tasks together and build a workflow and execution scheme for those tasks. FIG. 4 shows an example of how tasks can be arranged in a group 400 and a workflow 410. In this example, a Task Group Template A is shown having a plurality of grouped template forms (1, 2, 3A-B, and 4) associated with it. It will be appreciated that the example represented in FIG. 4 is simplified and that arrangements, groupings, and workflows between tasks as configured by the template forms may be more or less complex than depicted. In addition, it will be appreciated that multiple workflows and groupings may be simultaneously used and executed to implement a particular change and that multiple pieces of information, variables, and data can be configured for exchange between the various tasks, groups, etc.

As shown, the various task templates can be executed in a particular order by associating and arranging the task templates as a workflow 410. In this example, the workflow 410 follows the order of F1 to F3. Thus, the task of template 1 is executed first, then the task of template 2, and so on. Some features of the workflow 410 can be based on conditions or qualifications that can drive subsequent processing steps in implementing the change. For example, task template 2 can be configured to determine what subsequent task to implement next (e.g., either template 3A or 3B). Therefore, after the task associated with task template 2 is implemented and the implementation result returned for it, conditions or qualifications configured in the task template 2 can determine based on the particular implementation result returned whether the workflow proceeds next to the task of template 3A or that of template 3B.

The various task templates can also be set up to exchange variables and other data with the task group template A, with a variable pool, with each other, and with other tasks and groups. For example, after the task associated with task template 3A is implemented and the implementation result returned for it, the implementation result can be used as input in performing the subsequent tasks of template 4 to implement the change. Likewise, implementation results, variables, and other data resulting from performance of the task in template 1 can thereafter be used in performing the task in template 3B, for example, by configuring the templates to exchange data with a variable pool 420.

Figures 5A, 5B:
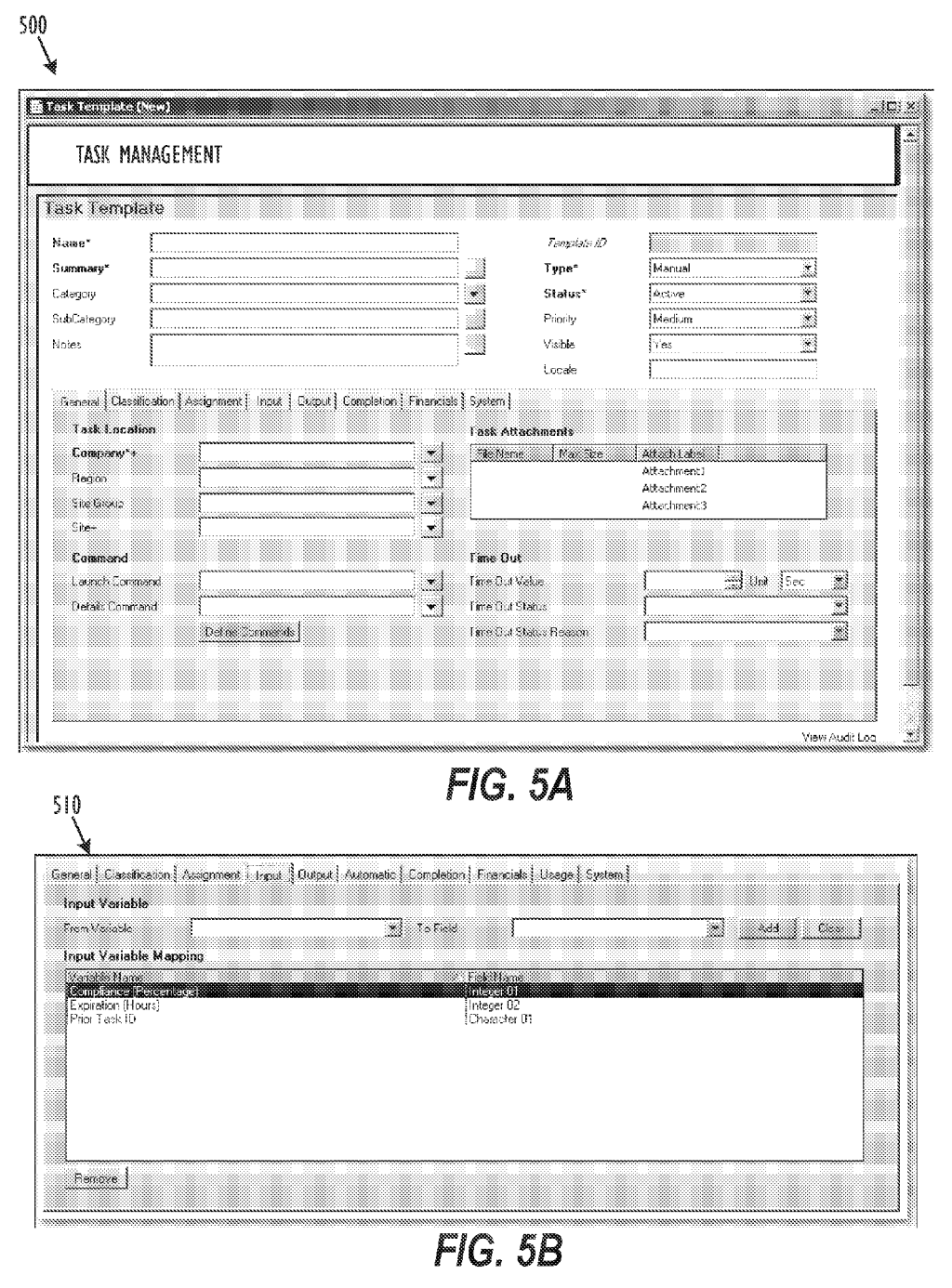

In the present embodiment, administrators use the GUI 212 and task template forms 214 of the task management tool 210 to configure the tasks group them together, make associations between them, and build the workflow of tasks. FIG. 5A, for example, shows a task template form 500 that administrators can use to configure the components of a task. In general, the user can create two distinct types of tasks. One type is a manual task where a person or other manual means performs a task's action manually. The other type of task is an automatic task where an automatic action or predefined instruction is executed at run time. Thus, the administrator can use the form 500 to create an automatic action that runs by itself, to define a specified action that must be accomplished manually, to enter data for mapping/associating input variables, and to input data that is written from the task to another task or task group in the form of an output variable.

As shown under the General tab of the form 500, an administrator can input commands for the task. These commands may be preconfigured or user-created and are stored as components associated with the interface (216) of the change management tool (200). The commands can include static values and parameters and can include command lines that will execute at runtime, such as launch or details commands. Some other tabs of the task template form 500 allow the user to classify a task and input assignments, completion, financials, usage, and system information for the task.

Figure 5C:
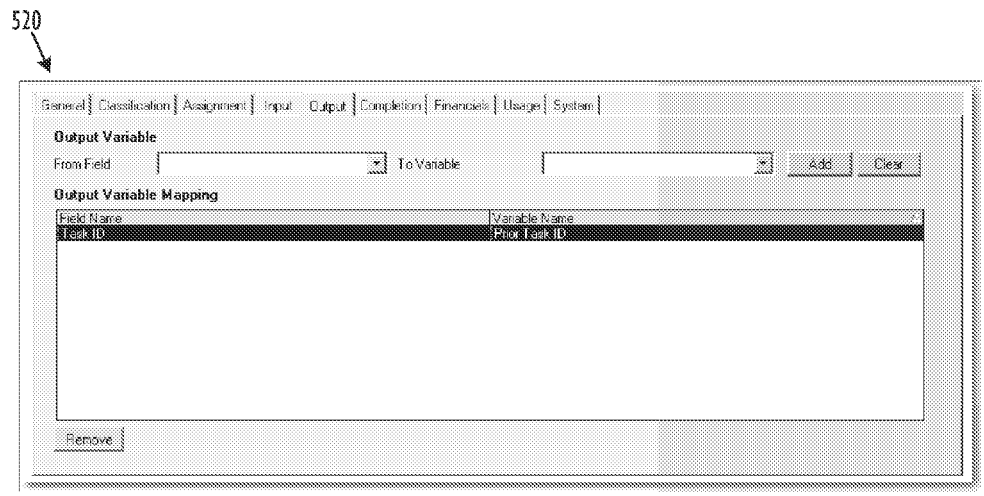

FIGS. 5B-5C show input and output tabs 510 and 520 of the task template form 500 of FIG. 5A. In these tabs 510/520, administrators can map/associate input and output variables that can be exchanged between the tasks and between the task and the pool of variables. Because implementation results (e.g., details about the success or failure of the task's implementation) can come from various disparate implementation tools 260/265, the administrator uses the input and output tabs 510 and 520 to map/associate disparate input formats (e.g., variables from returned results 240/245) to a more consistent reporting output format for the task management tool 210. The variable mappings/associations under these tabs 510/520 enable data to be passed into and out of fields when the task is executed at runtime. To define the mappings/associations, the variables can be user-defined or predefined, and the user can map existing variables to or from fields in the task template form. During execution, a pool of fields is made available in the task template form for variable usage so that variables can be mapped to and from the various fields defined for the task.

Figure 5D:
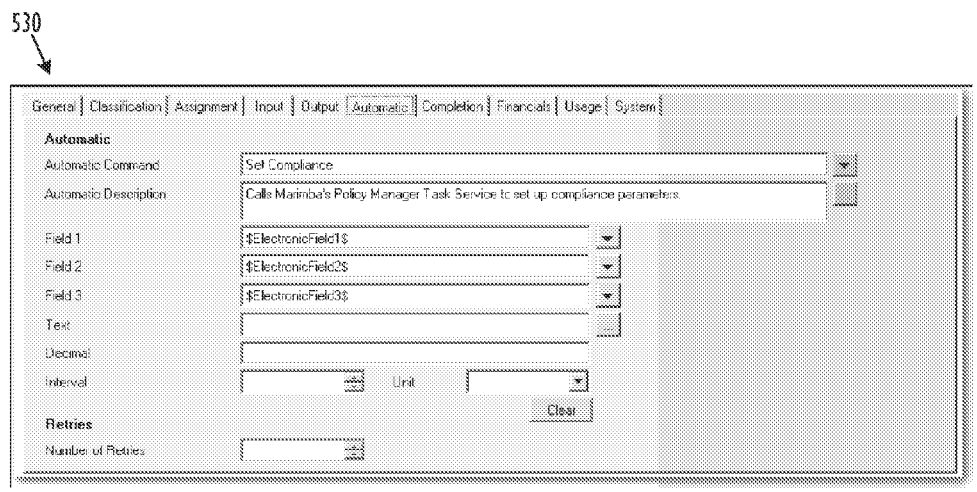

FIG. 5D shows the automatic tab 530 of the task template form 500 of FIG. 5A. In this tab 530, the administrator can define automatic commands for automatic types of tasks. Some of the automatic commands that can be configured include adding/deleting fields in a task template form, checking for approval to perform a task, copying a field from another task template form, setting up compliance parameters, and performing other automatic actions.

Figures 6A, 6B:
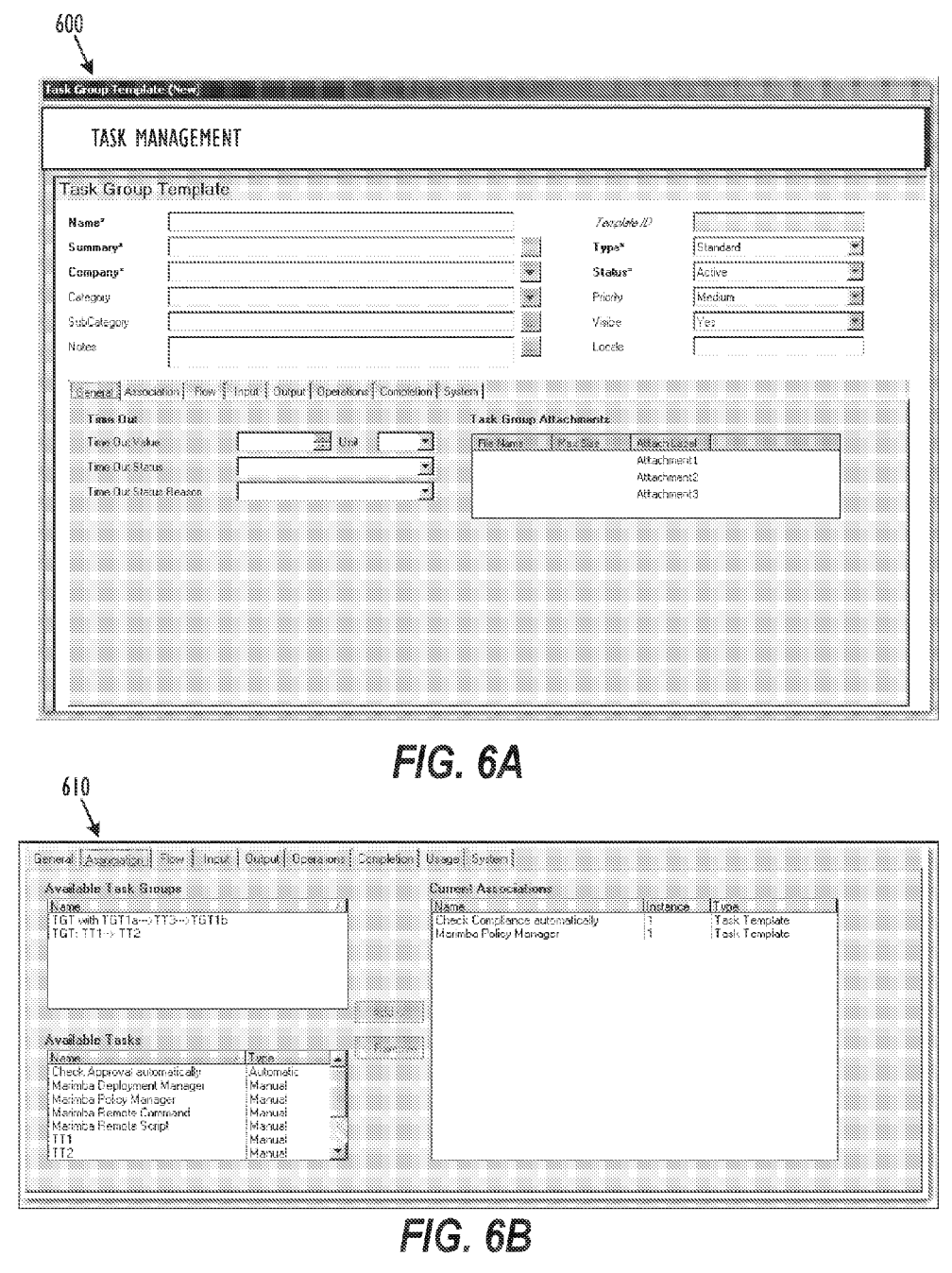

As mentioned previously, tasks can be grouped together and associated into workflows. FIG. 6A shows a task group template form 600 for administrators to create a group of tasks. This form 600 includes many similar features available with the individual task template form 500 of FIG. 5A. For example, the task group template form 600 has tabs for mapping/associating input and output variables that enable data to be passed into and out of fields when the task group is executed.

As shown in the association tab 610 of FIG. 6B, the administrator can define the task group by associating various individual task template forms and other task group template forms together to be contained in the group such that they constitute a certain action. Once various tasks and groups are associated together, the administrator then establishes how the associated tasks in the group relate to one another by creating a workflow.

Figures 6C, 6D:
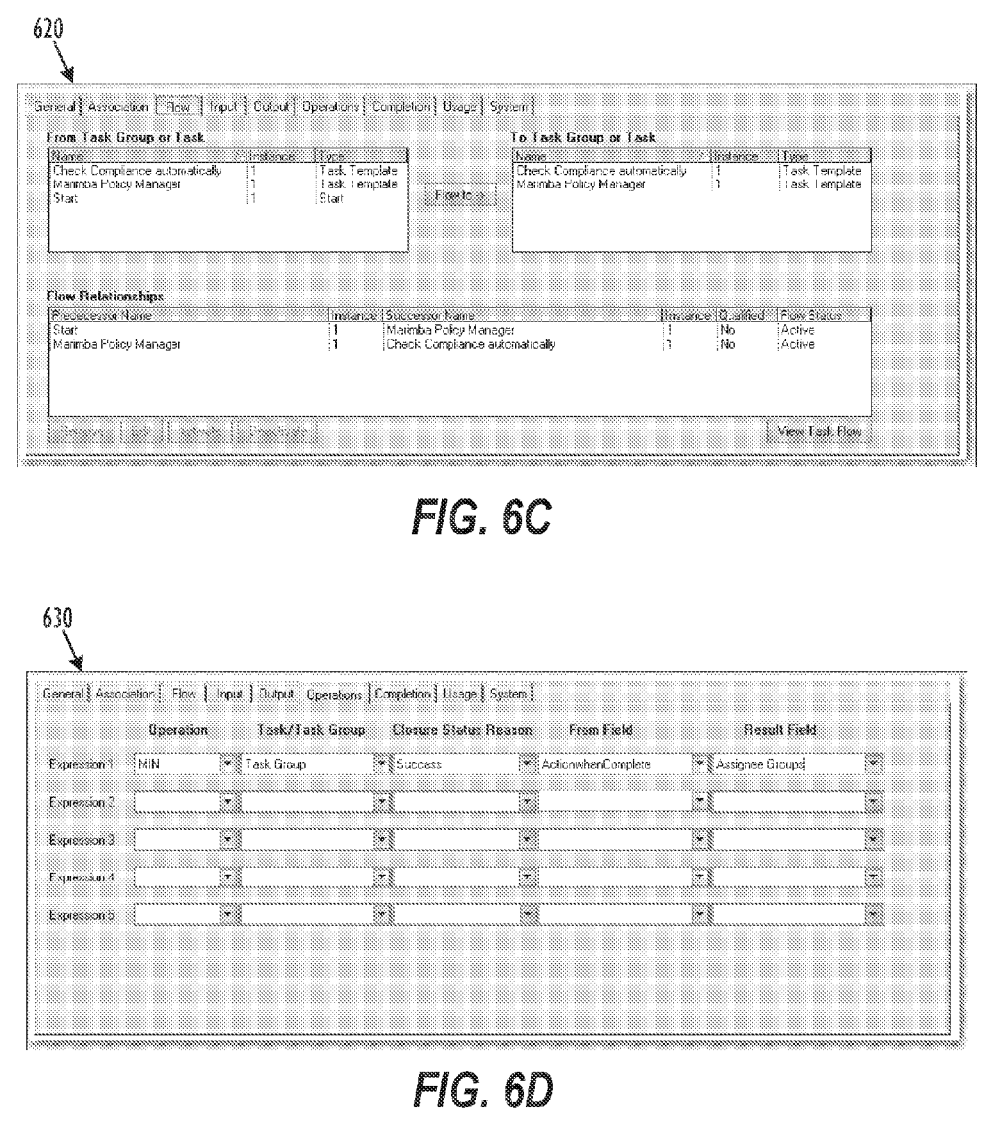

Using the flow tab 620 of FIG. 6C, the administrator can construct a workflow that will determine the sequence in which grouped tasks are generated at runtime. If the task group contains other task groups, these may already have a workflow established within their configuration. As shown in the flow relationship table, the group's flow consists of one or more flow relationship records. Each flow relationship record consists of a task group or task template form, called a predecessor, linked to another task group or task template form, called a successor. These records can be arranged to produce a number of possible flow relationships. For example, two tasks can be started at the same time by marking them both as Start. Tasks or task groups can occur simultaneously by linking the same predecessor to more than one successor. In addition, more than one task or task group can be completed before a successor can start by linking two or more predecessors to the same successor.

Because a change request 202 may involve multiple tasks to be performed to implement the change and the multiple tasks can be grouped together, the task management tool 210 is able to determine whether the tasks, group, and change has been successfully completed. By default, a task group may be determined complete only once all of the individual tasks and groups that it contains have run. When a task group is complete, its status is evaluated as either succeeding or failing, although other conditions can be used. By default, the task group is considered successful when all the task groups or tasks that it contains have a status of Success. If any do not have a status of Success, the task group can be given a status of Failed or Canceled.

As opposed to the above default evaluations of status, administrators can specify evaluations to determine whether a task group is complete or successful. In the operations tab 630 of FIG. 6D, for example, the administrator can define operations on variables gathered from associated task groups and individual tasks. These operations are built into evaluation statements to evaluate the resulting status of the tasks. Some possible operations on the variables can include determining minimum, maximum, sum, average, count, etc., and these operations can be applied to variables in the fields from the individual task and task group template forms from which data is to be collected. Result fields then stores the results of the expressions that are then made available to the administrators.

In the completions tab, the administrator can then construct conditions or qualifications that can drive the change process and that can determined when a task or group is done or completed. For example, the conditions or qualification can be built from the results fields of the various expressions in the operations tab 630. Based on the conditions or qualifications, the change process can be configured to determine what subsequent tasks are to be performed in implementing the change and what information is to be exchanged.

To facilitate the bidirectional communication between the change management tool 200 and the implementation tools 260/265, each implementation tool 260/265 has to be registered to accept task instructions 230/235 and associated tag information 273 (e.g., Change and Task IDs) from the change management tool 200, to know what to do with the task instructions and tag information, to know how to respond to the task instructions and tag information, and to use additional parameters. In addition, once registered, each registered implementation tool 260/265 may be provided its own unique identifier (e.g., Registry ID) that can be added to the tag information and used to identify implementation tools 260/265 and to track responses from the various implementation tools.

Figures 7, 8A:
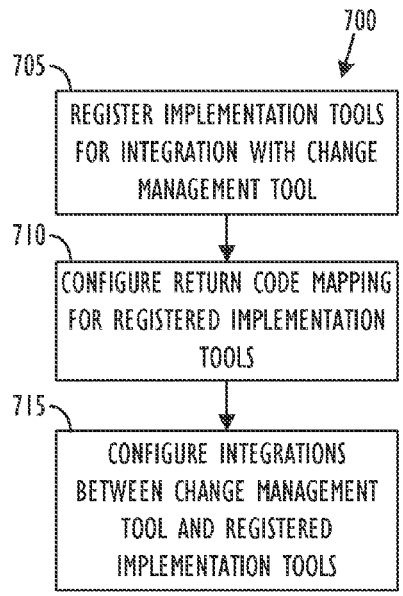
FIG. 7 illustrates a process for configuring bi-directional communication between the change management, task management, and implementation tools.
FIG. 8A illustrates a registry form for registering an implementation tool for bi-directional communication with the change management tool.

FIG. 7 shows a process 700 in flowchart form for initially configuring the bi-directional communication. The administrator first registers various implementation tools 260/265 to interface with the change management tool 200 and the task management tool 210 (Block 705). Then, the administrator configures how the various implementation results and details (e.g., return codes) received from the registered implementation tools 260/265 will map to desired status details (e.g., success or failure) at the change management level within the change management tool 200 (Block 710). Finally, the administrator configures the integrations between the change management tool 200 and the implementation tools 260/265 so that they will be able to interface in bi-directional communication during the change management process (Block 715).

To register an implementation tool 260/265 under the acts of Block 705, the administrator performs the registration process using a registry form of the GUI 212 so the implementation tool 260/265 can be recognized by the interface 216. FIG. 8A shows a registry form 800 for registering an implementation tool (260/265) for use with the change management tool (200). As generally shown, the administrator can register a name, description, and status (active or inactive) of the implementation tool (i. e., application). For each tool registered, the change management tool 200 generates a unique identifier (e.g., a Registry ID). In various fields, the administrator can define what forms (template, instance) are to be associated with the implementation tool and can define connection information for communicating with the implementation tool, such as whether the connection is local or remote. The administrator can also associate various elements, such as templates 214, interface forms, instance forms, etc., with the implementation tool. In this way, the registered information becomes a means for the task management tool 210 to recognize the implementation tool 260/265, to set the configuration settings such as mode of connection (local or remote), and to use this information to establish the context for the features of the task management tool 210 that will be used for the associated implementation tool 260/265.

To configure return code mapping/association under the acts of Block 710 of FIG. 7, the administrator configures how various return code values from registered implementation tools 260/265 will map to information for the various task forms of the GUI 212 defined for a change request. On there own, the return code values from a given implementation tool 260/265 may not be very useful for determining status of a change request or task and whether the overall change request and its subtasks are complete. Thus, by configuring the mapping/association of return codes, the administrator can specify how the status and reasons for a given task should be mapped to/associated with a particular return code received from an implementation tool 260/265.

Figures 8B, 8C:
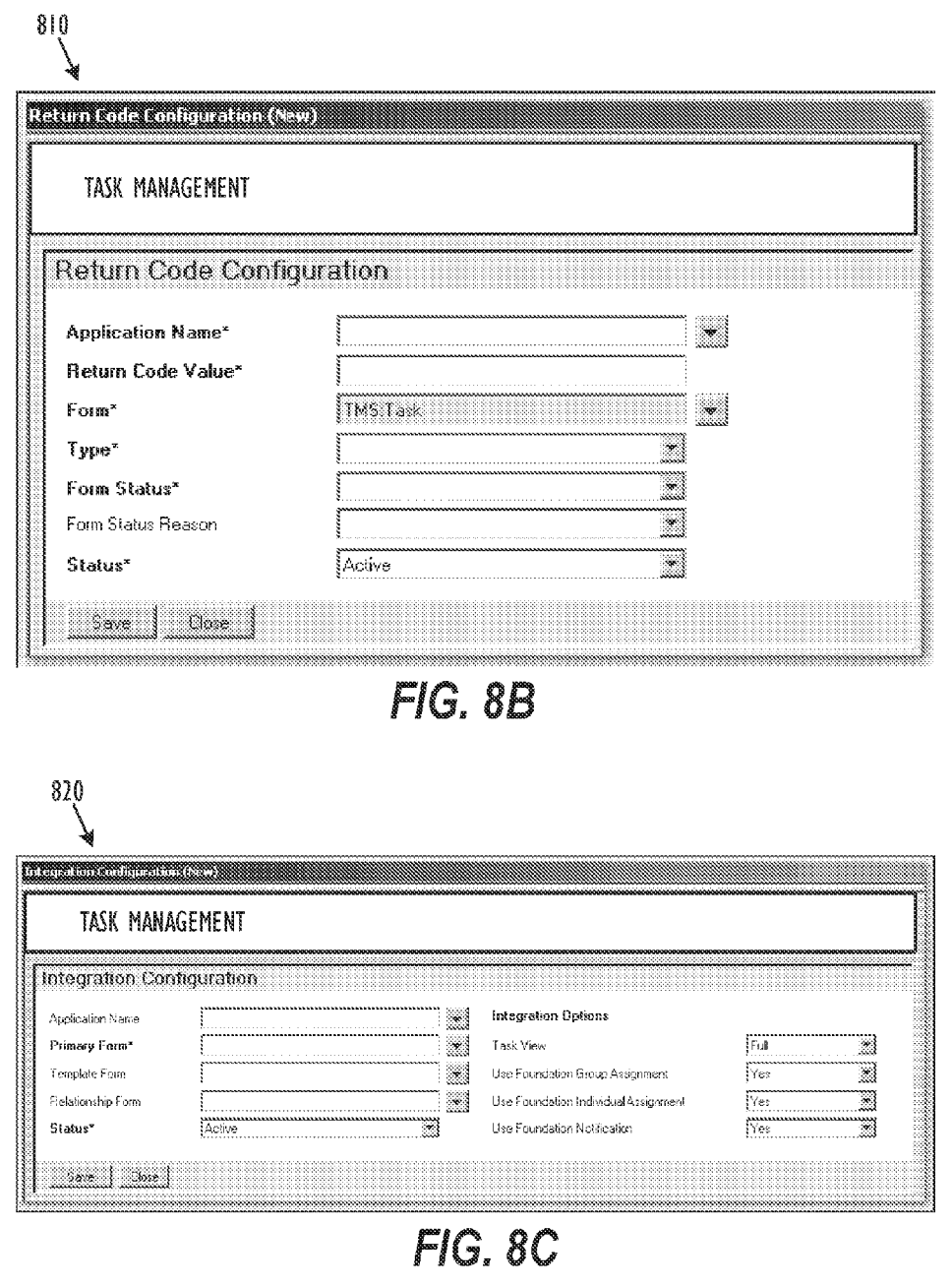

FIG. 8B shows a return code form 810 for configuring how return codes from implementation tools 260/265 map to desired status information at the management tools (200, 210). As generally shown, the administrator can select one of the registered implementation tools (i.e., application name) and input a return code value that would be returned from this selected tool. Then, the administrator can select a template form (e.g., task or group template forms) to associate with the return code, a corresponding status that the return code will map to on the selected form, a corresponding status reason that will be provided on the selected form, and an indication of whether the entered return code is active or not. At runtime when the implementation tool returns the specific return code value, the corresponding status and status reason are mapped on the task template form. For example, a return code value of Error from an implementation tool 260/265 could be mapped to indicate a status of Pending and a status reason of Error on a task template form.

To integrate the tools under the acts of Block 715 of FIG. 7, the administrator configures the template forms 214 of the task management tool 210 to integrate with the registered implementations tools 260/265. FIG. 8C shows an integration form 820 for configuring an interface between an implementation tool (260/265) and the management tools (200/210). As generally shown, the administrator can select a registered implementation tool (i.e., application name) for integration with the change and task management tools (200/210). The administrator can associate one or more template forms (214) with the selected implementation tool (260/265) by associating a primary form, a template form, and a relationship form with that selected tool, for example. In addition, the administrator can indicate the integration as being active or inactive and can indicate options for the integration, such as whether to use a particular size view, group assignments, individual assignments, and notifications. Finally, the administrator can define what fields to include for a task when a task template form is opened and can define other details for inputting, viewing, and relating information between tasks and the implementation tool.

As shown by the various template forms 214 and other components of the GUI 212 of the task management tool 210 in FIGS. 5A-5D, 6A-6D, and 8A-8C, a change request 202 can be configured to have various elements of information grouped and associated together and arranged in workflows. The tag information (e.g., Change ID, Task IDs, Registry IDs, access information, log-in and authentication information, and any other information) for the task instructions 230/235 to implement the change request 202 is used pervasively throughout the implementation of the change in the configuration so that the change process involves a closed loop where changes involving multiple tasks can be implemented and verified effectively in the IT infrastructure.

Acts in accordance with the disclosed change and task management techniques may be performed by a programmable control device executing instructions organized into one or more program modules. A programmable control device may be a single computer processor, a special purpose processor, a plurality of processors coupled by a communications link or a custom designed state machine. Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:
1. A method, comprising:
registering a plurality of task implementation tools to interface with a change management tool,
the change management tool configured to associate a unique change identifier ("unique Change ID") with a change request specifying a change to an information technology infrastructure's configuration, to configure a plurality of tasks to implement the change, associate each of the plurality of tasks with an unique individual task identifier ("unique Task ID"), and send a plurality of task instructions to the plurality of task implementation tools for performing the plurality of tasks,
each task instruction being directed to a targeted task implementation tool for performing a particular task of the plurality of tasks to implement the change to the information technology infrastructure's configuration specified by the change request, each task instruction including task-related information for the targeted implementation tool to perform the particular task, the unique Change ID associated with the change request and the unique Task ID associated with the particular task; and wherein registering the plurality of task implementation tools to interface with the change management tool includes registering each of the plurality of task implementation tools to accept the task instruction for the particular task directed to it from the change management tool, to know what to do with the task instruction and to know how to respond to the task instruction.

2. The method of claim 1, wherein registering each the plurality of task implementation tools includes providing a unique identifier ("unique Registry ID") to each registered task implementation tool.

3. The method of claim 2, further comprising, configuring each registered task implementation tool to respond to the change management a result indicating an implementation status of the particular task, the result further including a return of the unique Change ID and the unique Task ID sent by the change management tool in the task instruction for the particular task and a return of the unique Registry ID of the registered task implementation tool.

4. The method of claim 3, further comprising, configuring a mapping of the result received by the change management tool from the registered implementation tool to a success or failure status of the change request at a change management level within the change management tool.

5. The method of claim 3, wherein configuring the mapping of the result from the registered implementation tool to a success or failure status of the change request at a change management level within the change management tool includes configuring a mapping of the unique Change ID, the unique Task ID and the unique Registry ID in the result to the success or failure status of the change request.

6. The method of claim 3, wherein configuring the mapping of the result from the registered implementation tool to a success or failure status of the change request at a change management level within the change management tool includes configuring the change management tool to use the unique Change ID and the unique Task IDs for the plurality of tasks and the unique Registry IDs for the registered task implementation tools in the received results to match and track implementation of the change request and each of the plurality of tasks associated with the change request across the information technology infrastructure.

7. The method of claim 1, wherein registering the plurality of task implementation tools to interface with the change management tool includes establishing bi-directional communication between each of the plurality of task implementation tools and the change management tool.

8. The method of claim 1, wherein registering the plurality of task implementation tools to interface with the change management tool includes using a registry form on a graphical user interface of the change management tool for each of the plurality of task implementation tools.

9. The method of claim 8 wherein registering the plurality of task implementation tools to interface with the change management tool includes entering a name, a description, and an active status or inactive status of the implementation tool in the registry form.

10. The method of claim 8 wherein registering the plurality of task implementation tools to interface with the change management tool further includes defining template, interface and instance forms associated with the implementation tool, and defining connection information for communicating with the implementation tool, in the registry form.

11. A non-transitory storage device, readable by a programmable control device, comprising instructions stored on the non-transitory storage device for causing the programmable control device to perform the method according to claim 1.

12. A system, comprising:

a processor coupled to a computer memory, the processor configured to execute instructions to implement a change management tool coupled to an information technology infrastructure, the change management tool configured to:

register a plurality of task implementation tools to interface with the change management tool, the change management tool configured to associate a unique change identifier ("unique Change ID") with a change request specifying a change to an information technology infrastructure's configuration, to configure a plurality of tasks to implement the change, associate each of the plurality of tasks with an unique individual task identifier ("unique Task ID"), and send a plurality of task instructions to the plurality of task implementation tools for performing the plurality of tasks, each task instruction being directed to a targeted task implementation tool for performing a particular task of the plurality of tasks to implement the change to the information technology infrastructure's configuration specified by the change request, each task instruction including task-related information for the targeted implementation tool to perform the particular task, the unique Change ID associated with the change request and the unique Task ID associated with the particular task; and wherein registering the plurality of task implementation tools to interface with the change management tool includes registering each of the plurality of task implementation tools to accept the task instruction for the particular task directed to it from the change management tool, to know what to do with the task instruction and to know how to respond to the task instruction.

13. The system of claim 12, wherein the change management tool is further configured to provide a unique identifier ("unique Registry ID") to each registered task implementation tool.

14. The system of claim 13, wherein each registered task implementation tool is configured to return to the change management a result indicating an implementation status of the particular task, the result further including a return of the unique Change ID and the unique Task ID sent by the change management tool in the task instruction for the particular task and the unique Registry ID of the registered task implementation tool.

15. The system of claim 14, wherein the change management tool is further configured to map the result received from the registered implementation tool to a success or failure status of the change request at a change management level within the change management tool.

16. The system of claim 14, wherein the change management tool is further configured to map the unique Change ID, the unique Task ID and the unique Registry ID in the result to the success or failure status of the change request.

17. The system of claim 14, wherein the change management tool is further configured to use the unique Change ID and the unique Task IDs for the plurality of tasks and the unique Registry IDs for the registered task implementation tools in the received results to match and track implementation of the change request and each of the plurality of tasks associated with the change request across the information technology infrastructure.

18. The system of claim 12, wherein the change management tool configured to: establish bi-directional communication between each of the plurality of task implementation tools and the change management tool.

19. The system of claim 12, wherein a respective registry form on a graphical user interface of the change management tool is used to register each of the plurality of task implementation tools.

20. The system of claim 19, wherein the registry form for each registered implementation tool includes a name, a description, an active status or inactive status of the implementation tool, identifications of template, interface and instance forms associated with the implementation tool, and connection information for communicating with the implementation tool, in the registry form.

* * * * *

UNITED STATES PATENT AND TRADEMARK OFFICE
CERTIFICATE OF CORRECTION

PATENT NO.      : 9,152,413 B2
APPLICATION NO. : 14/535030
DATED           : October 6, 2015
INVENTOR(S)     : Kia Behnia et al.

Page 1 of 1

It is certified that error appears in the above-identified patent and that said Letters Patent is hereby corrected as shown below:

On the title page item 57, in column 2, in "Abstract", line 12, delete "each the" and insert -- each of the --, therefor.

In the claims

In column 13, line 15, in claim 2, delete "each the" and insert -- each of the --, therefor.

Signed and Sealed this
Fifth Day of April, 2016

Michelle K. Lee
*Director of the United States Patent and Trademark Office*